US006701215B1

(12) United States Patent
Stadermann

(10) Patent No.: US 6,701,215 B1
(45) Date of Patent: Mar. 2, 2004

(54) BULK MAILING TRACKING SYSTEM

(76) Inventor: Greg C. Stadermann, 3637 Sycamore Dairy Rd., Fayetteville, NC (US) 28303

( * ) Notice: Subject to any disclaimer, the term of this patent is extended or adjusted under 35 U.S.C. 154(b) by 313 days.

(21) Appl. No.: 09/729,742

(22) Filed: Dec. 6, 2000

Related U.S. Application Data

(60) Provisional application No. 60/204,954, filed on May 17, 2000, and provisional application No. 60/202,676, filed on May 8, 2000.

(51) Int. Cl.[7] .................................................. G06F 7/00
(52) U.S. Cl. ....................................... 700/225; 700/227
(58) Field of Search ................................ 700/213, 225, 700/226, 227; 705/410, 404, 408

(56) References Cited

U.S. PATENT DOCUMENTS 5,072,400 A * 12/1991 Manduley ...................... 177/4
5,072,401 A * 12/1991 Sansone et al. ............. 700/219
5,161,109 A * 11/1992 Keating et al. ............. 700/213
5,673,193 A * 9/1997 Brust et al. ................. 700/219
5,953,427 A * 9/1999 Cordery et al. ............... 380/51

* cited by examiner

*Primary Examiner*—Khoi H. Tran
(74) *Attorney, Agent, or Firm*—Mills Law Firm PLLC

(57) ABSTRACT

An acceptance and verification system creates data base records for each posted item of a bulk mailing so as to provide early notification to a mailing system as to the content of mail to be delivered by a bulk mailer in advance of physical delivery at the facility. A unique scanner readable bar code on the posted item provides documentation on the processing of each posted item and verifies correspondence between the notification and the documentation including item related specifics.

2 Claims, 4 Drawing Sheets

BULK MAILING TRACKING SYSTEM

RELATED APPLICATIONS

This application claims the benefit under 35 USC 121 to U.S. Provisional Application No. 60/202,676 filed on May 8, 2000 in the name of Greg C. Stadermann and entitled "Automated Acceptance and Verification of Mail at Bulk Mailing Facilities" and No. 60/204,954, filed May 17, 2000.

FIELD OF THE INVENTION

The present invention relates to bulk mailing systems and, in particular, to a system for notifying, accepting and verifying individual pieces of mail in the bulk mailing of posted material.

BACKGROUND OF THE INVENTION

The bulk mailing of certain types of mail is becoming increasingly common. Therein, an organization preparing invoices, notices, and other informative literature directed to a plurality of addressees will oftentimes, directly or through third parties, prepare an entire item is a single highly automated, printing, stuffing and mailing operation using programs authorized by the postal authorities thereby controlling and lowering the costs for the mailing.

When using a third party bulk mailer or agent, for instance, an organization, such as a utility, will provide the bulk mailer with computer generated data for preparing, addressing and mailing an invoice for each customer. Accessing such data, the bulk mailer prints the invoices from plain paper in a format and with information as desired by the organization, and places the invoices in envelopes imprinted with the desired address. Item by item, depending on the rate structure applicable to the individual invoice, the proper postage is affixed. Generally, the postage rate is determined by a number of factors including postal area, weight, and the sorting capabilities. Such items are amassed, bound, and placed on trays for transfer to a mailing facility that handles bulk mail for the postal system. Upon arrival at the bulk mailing system, only limited information is provided to the postal service with regard to the items in each tray, generally limited to total postage, number of pieces, ZIP code and the like. Moreover, such limited information is available only when the trays are physically delivered to the mailing system, not in advance thereof. Accordingly, the mailing system does not possess and cannot acquire information regarding incoming shipments so as to allocate time and resources thereto in a time cost efficient manner.

Upon arrival at the mailing facility, the trays must be receipted and a cursory accuracy manually determined by randomly selecting items from the tray and confirming the correctness of the delivered information. If existing standards are met, the shipment, en masse, is accepted and delivered to automatic sorting machinery for further processing prior to physical delivery. Thereafter, the bulk mailer and the originating entity are removed from further operational contact with the mailing system. Further, no additional information is gathered regarding the identity or correctness of the items and/or shipment and, accordingly, the originating entity and bulk mailer have no ability to verify status, processing or delivery of their items.

Such existing systems are also limited in the feedback information available to both parties regarding the performance and accuracy of the overall system, the bulk mailer or the mailing system. Missing items in a presumed printing sequence cannot be determined. Duplicate or missing items are not be identified. Proper postage criteria for meeting the postal schedules are not verified. Thus, even though substantial benefits for both the addressor and the postal system are provided through bulk mailing techniques, no verification as to individual items is provided, and remedial actions for any irregularities are not readily apparent.

Accordingly, it is an object of the present invention to provide an improved bulk mailing system for verifying on an item-by-item basis the accuracy between submitted and delivered items.

A further object of the invention is to provide a system for tracking individual items from preparation by a bulk mailer through processing by a postal system.

Another object of the invention is to provide a system for determining the accuracy with which a postal system and a mailing agent address, process and deliver individually posted items.

Yet another object of the invention is to provide a discrete data record for each posted item delivered to and processed by a postal system to enable ascertaining accuracy of performance.

A further object of the invention is to create a unique identifier on each item of posted material enabling the tracking of individual material from preparation of the posted item through processing at a postal facility.

A still further object of the invention is to provide a system for notifying a postage facility as to the content of a prospective bulk mailing prior to the delivery thereof.

BRIEF SUMMARY OF THE INVENTION

The foregoing objects are accomplished by a bulk mailing tracking that creates data base records for each posted item of a bulk mailing so as to enable early notification to a mailing systems as to the content of mail to be delivered by a bulk mailer in advance of physical delivery at the facility, documentation as to the processing of each posted item at the postal facility, and verification as to the correspondence between notification and documentation including item related specifics thereof. The foregoing capabilities are accomplished through utilization of a unique imprinted identifier on each mailed item, preferably in the form of a postal acceptance bar code that appears in the return address envelope window. The bar code may be scanned by conventional equipment. The bar code provides subsets of information relating to the mailing of the individual item and others in the mass mailing, including, the job activity number, date, mailing agent, originating addressor, weight, postage, and physical location within a mailing container to be presented to the mailing facility. At the mailing agent, a notification file is prepared based on the bar codes of the submitted items.

The notification file is made available on a server to the mailing facility and provides advance notice of incoming mail so that equipment and personnel can be appropriately scheduled. In view of the notification file, the submitted mail need only be delivered. It is no longer necessary to obtain a physical receipt and to run a preliminary audit of the submitted mail to denote compliance. At the postal facility, the physical mail is processed at an acceptance machine for conventional sorting and routing, and concurrently a processing file is prepared of the mail passing therethrough as determined by the bar code scan. The processing file is compared against the notification file, and an exception file generated listing on an item by item basis any discrepancies between the lists. The exception file is available on the main server and designates items at variance with any of the bar codes or subset information. In this manner, missing and duplicate items can be identified, orphan or non-listed items designated, and variances on any of the subset information denoted. Such knowledge allows the mailing agent and originating party to eliminate redundancies, alter postage programs and take other corrective actions to increase compliance. The various files may also be accessed by the involved parties for determining processing date, location of items in the system and other productivity and marketing information helpful in evaluating performance. By converting mass mailings into individual record files, the mailing history and performance by all concerned may be quickly determined for each item.

DESCRIPTION OF THE DRAWINGS

The above and other objects and advantages of the present invention will become apparent upon reading the following detailed description taken in conjunction with the accompanying drawings in which.

DETAILED DESCRIPTION OF THE PREFERRED EMBODIMENT

Figure 1:
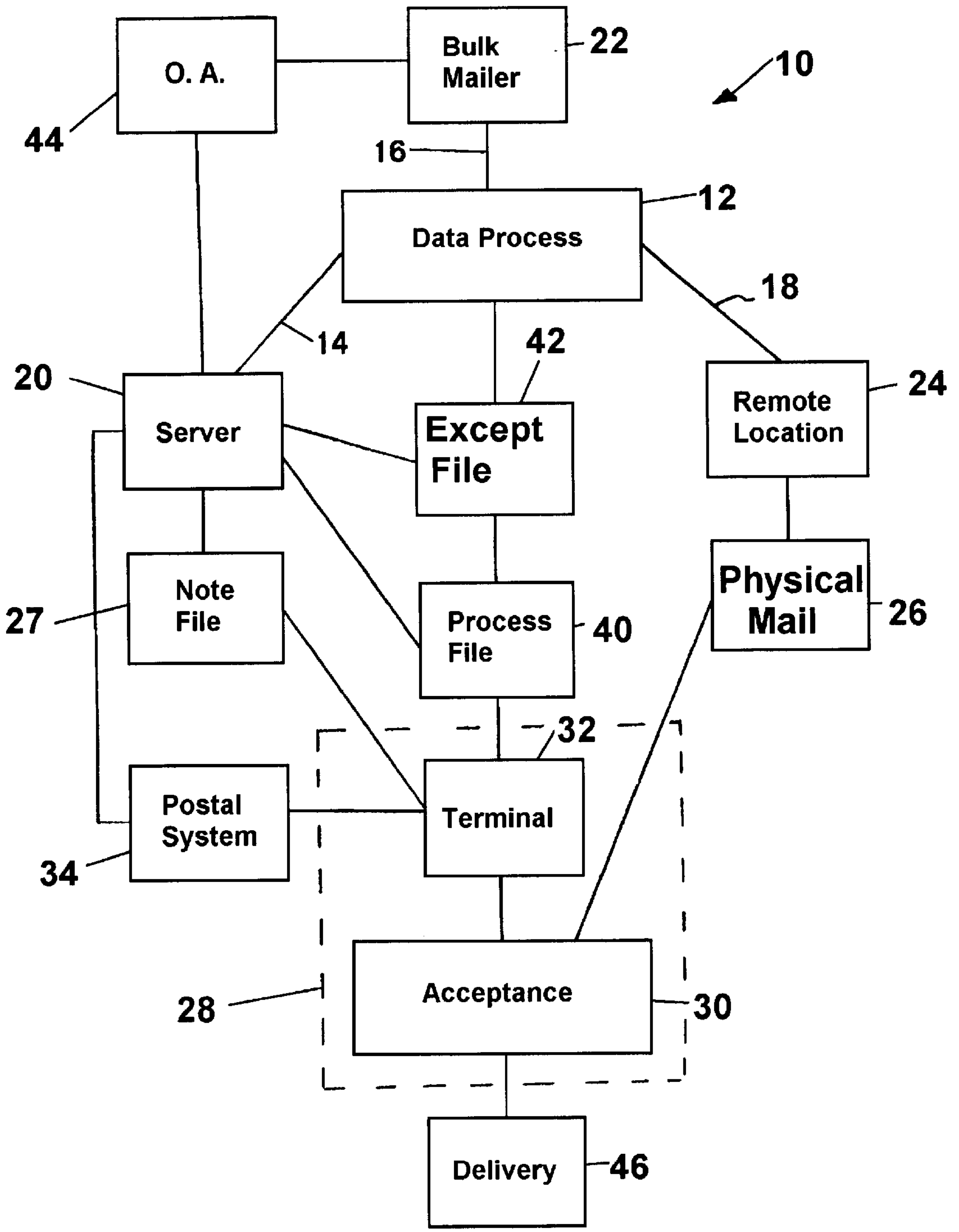
FIG. 1 is a flow schematic diagram of the acceptance and verification system in accordance with a preferred embodiment of the invention.

Referring to the drawings for the purposes of illustrating preferred embodiments of the invention and not for limiting same, FIG. 1 illustrates a bulk mailing tracking system 10 for the processing, mailing and delivery of posted material. The bulk mailing tracking system 10 comprises a data processing unit 12 connected by data communication lines 14, 16, 18, physical or satellite, to a server 20, a bulk mailer 22 and a remote location 24, both having printing and labeling equipment 25, respectively. The remote location 24 prepares physical mail 26, created from information furnished by a bulk mailer 22 and generates a notification file 27 available at the server 20. The physical mail 26 is delivered to a postal facility 28 having conventional bulk mailing equipment including an acceptance machine 30 coupled with a terminal computer 32. The acceptance machine 30 processes and sorts the postal mail 26 for delivery. Based on processing at the remote location 24, a notification file 27 is generated for delivery through telecommunication lines, physical or satellite, from the server 20 to the terminal computer 32 and interconnected terminals at the postal system 34. The physical mail 26 is transferred by conventional transportation to the postal facility 28. Subsequent to processing at the acceptance machine 30, a processing file 40 is prepared on the items handled at the acceptance machine. The processing file 40 is compared to the notification file 27 and an exception file 42 is generated and information based thereon is available at the server 20 for access by various parties. The server 20, the data processing 12, and the remote location 24 may involve separate parties, or preferably be common to the bulk mailer 22.

Based on processing at the remote location 24, a notification file 34 is generated for delivery through telecommunication lines 32, physical or satellite, from the server 20 to the terminal computer 32 and interconnected terminals at the postal system 34. The physical mail 26 is transferred by conventional transportation to the postal facility 28. Subsequent to processing at the acceptance machine 30, a processing file 40 is prepared on the items handled at the acceptance machine. The processing file 40 is compared to the notification file 27 and an exception file 42 is generated and information based thereon is available at the server 20 for access by various parties. The server 20, the data processing 12, and the remote location 24 may involve separate parties, or preferably be common to the bulk mailer 22.

As is well known, the bulk mailer 22 may be a party that receives digital information from an originating addressor 44 for creating mass mailed items. The bulk mailer 22 formats and prints at the remote location 24 the items based on such information, inserts the items into an appropriate postal package, affixes proper postage, and delivers the items in bulk to the postal facility for further processing, and delivery 46 to the addressee. In this connection, the mailing entity and the creating entity may be a single or related entity. In other cases, the mailing entity may be a third party bulk mailing agent who receives the necessary information from the originating entity or creating addressor, formats and prints the items as requested, addresses and packages the material to the addressee, affixes postage, and delivers the material in bulk to the mailing facility.

For various economic and other considerations, the bulk mailing agent may transfer such information, in whole or in part, to a remote facility, local to the addressees, for such processing. The remote facility may be independent or related to the bulk mailing agent. It will nonetheless be apparent that the verification, acceptance, compliance and audit functions of the system are compatible with respect to all such alliances.

The data processing unit 12 is maintained by the bulk mailer 22 and receives the necessary information digitally from the originating addressor 44. For each task supplied by the originating addressor, the bulk mailer 22 subdivides the task as necessary into separate subtasks or jobs, based for example geographical, alphabetical, subject matter and other defining criteria.

Figure 2:
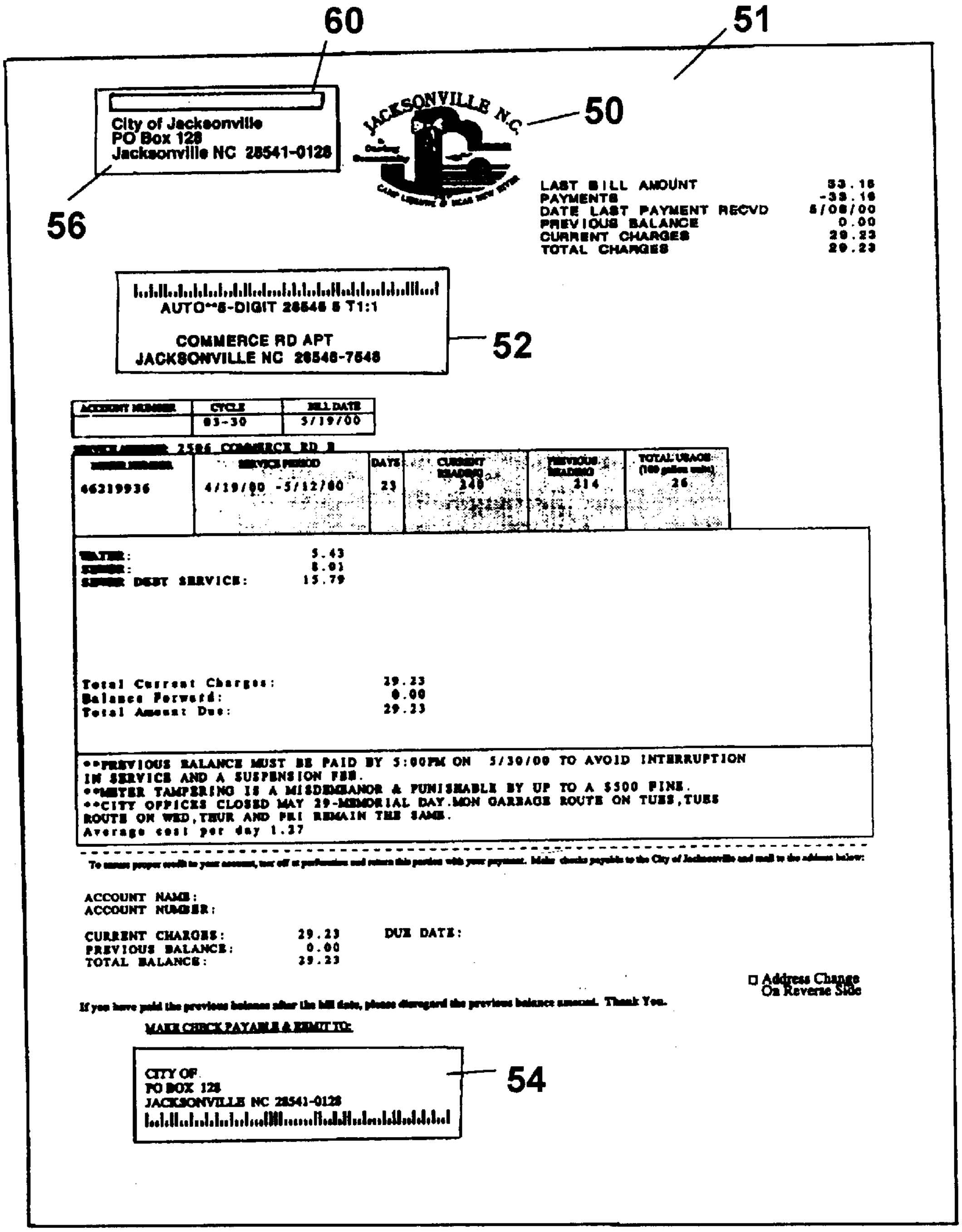
FIG. 2 is an illustration of a statement form for use with the acceptance and verification system.

Referring to FIG. 2 for illustrative purposes, the originating entity or creating addressor may be a utility 50 sending a statement 51 of usage to an addressee as set forth in an addressee field 52. Therein, in addition to the relevant information relating to the account, the statement normally will contain an addressee field 52 setting forth the name, address and postal bar code for the recipient, a return field 54 setting for the name, address and postal bar code for remittances, usually in a windowed enclosed return envelope, and an originating or mailing field 56 setting forth the name and address of the mailing entity and including a postal acceptance link bar code, hereinafter "PAL code" 60, in readable bar code format as shown in greater detail in FIG. 3 and set forth in greater detail below. After printing, the statement 51 is folded and stuffed into a two-window envelope 62 as shown in FIG. 4, along with ancillary material and a return envelope. The envelope 62 is sealed and postage 64 applied using conventional equipment. As completed, the addressee field 54 is visible and machine readable through envelope window 66, and the mailing field 56 including PAL code 60 is visible and machine readable through envelope window 68 in the upper left hand corner thereof.

Figure 3:
FIG. 3 is an illustration of a statement form enclosed in a transmittal envelope.
Figure 4:
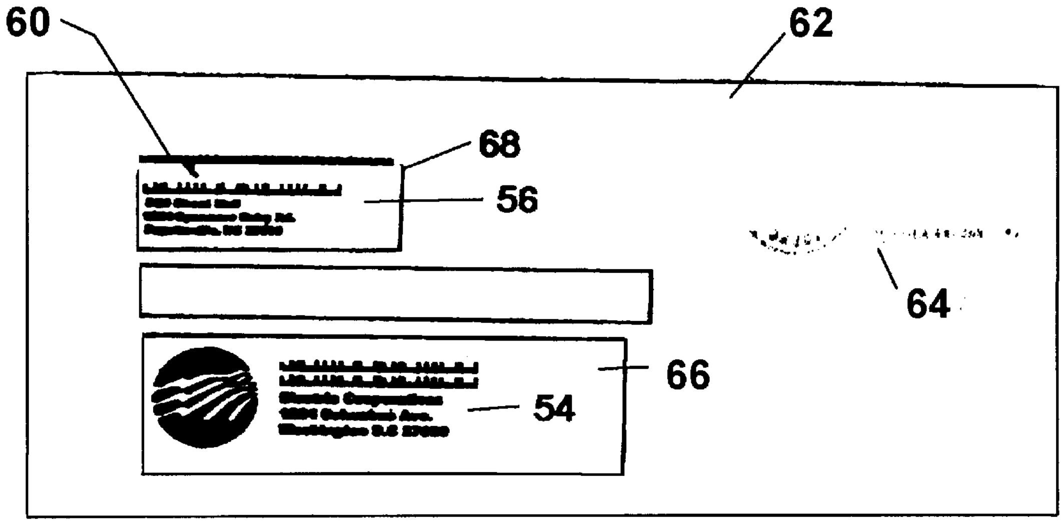
FIG. 4 is an illustration of a postal acceptance link bar code for use on the statement of FIG. 2.

Referring to FIG. 3, the PAL code 60 is printed in accordance with a bar code format used by the postal service for sorting and delivery as appended in the addressee field 54 and the mailing field 56. The PAL code 60 is formatted to create a unique identifier for each piece of mail. The PAL code is arranged in subsets, including a date subset 70, a mailing agent subset 72, a "ghost" subset 74 for the originating party, a job name subset 76 for identifying the task at the mailing agent or remote location, a weight subset 78 based on calculated weight, a postage subset 80 for affixed postage, and a sequence identity subset 82 denoting spatial location of the item in the physical packaging of the job. Such information creates for data processing a unique identifier for each mailing piece. Such unique identifier may be used as the item progresses through the mailing process from the remote location to ultimate delivery. For upstream purposes, the code 60 may be used by the mailing agent and/or creating entity for accessing information on the delivery as well as the content of the statement. For downstream purposes, the code 60 may be used by the mailing agent, creating entity, or postal system for verification, acceptance, status, and other purposes incident to the discrete item, to be described in greater detail below.

The record for each item is routed as a data file and the notification file 27 created for each job. The notification file 27 comprises the PAL codes for the mailing and other summary or aggregate information on the subsets. The notification file 27 is routed to the server 20 and therethrough made available at the terminal 32 of the acceptance equipment 30. Upon creation, the bulk mailing facility is apprised of scheduled incoming bulk mail and specifics thereof. Based on such advance notice, the acceptance facility can allocate appropriately personnel and equipment resources. In the past, only limited information was available upon actual physical delivery of the bulk mail job, and the information was not item specific. With the present system, concurrently information through the notification file 27 is available to the bulk mailer and addressor at the server 20 on a real-time basis.

Figure 5:
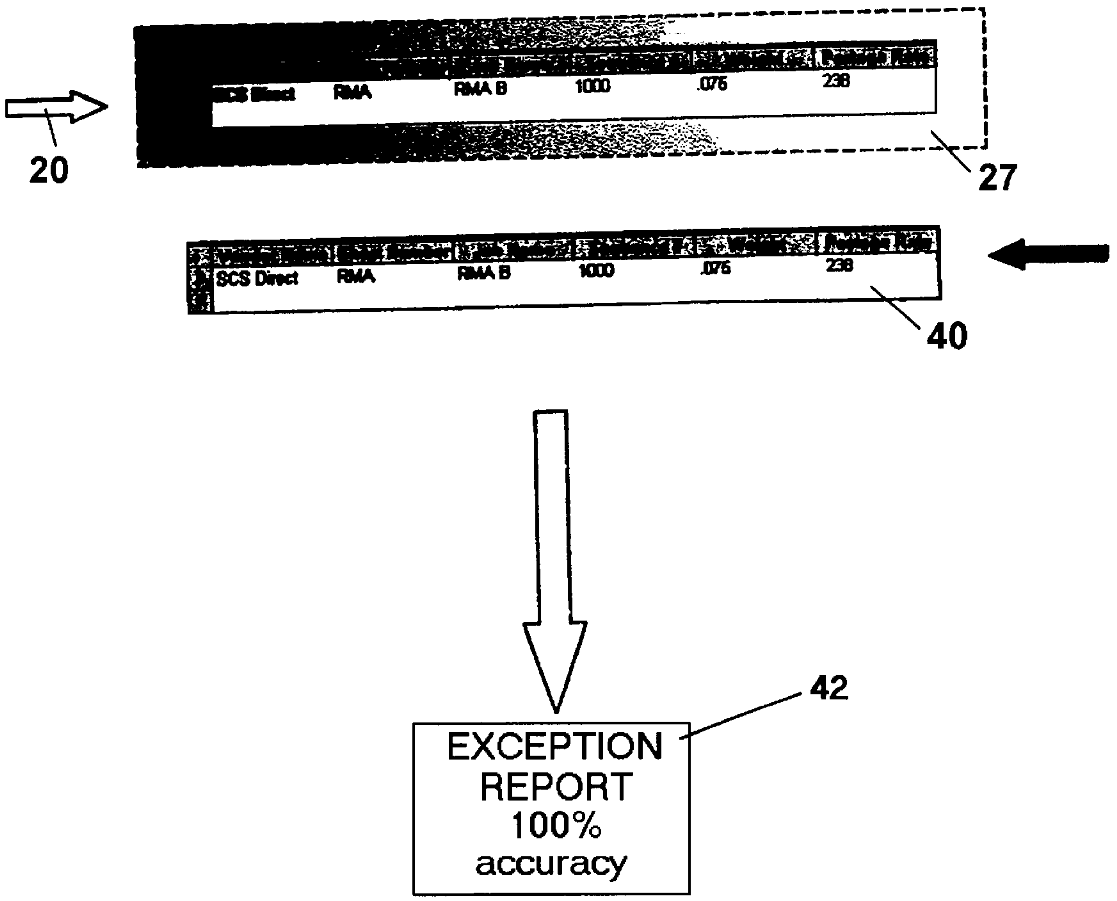
FIG. 5 is an illustration of a portion of a notification file, a portion of a processing file, and a notification file.

In order to process and track the pieces of mail in the notification file 27, the acceptance machine 30 is provided with a secondary bar code reader, not shown. The secondary bar code reader, conventional in construction and operation, creates a record for each mail item passing therethrough including the PAL code 60 and identifying aspects of the acceptance such as date, time facility and the like. Based on such reading, the terminal 32 then prepares the processing file 40. Referring to FIG. 5, the processing file 40 is then compared with the notification file 27, and the exception file 42 is generated listing any additions, deletions or variations and inconsistencies between the notification file 34 and the processing file 40. The exception file 42 is then routed to the server 20 for access by the bulk mailer 22, the originating addressor 44, and postal facility 28 and postal system 34. Alternatively, the records may be transferred to the data processing unit 12 for preparation and issuance of the exception file.

As shown in FIG. 5, the exception file 42 may only note compliance between the notification file and the processing file. Where variances occur, it will be appreciated that each variance may be noted by subset, individually or collectively, characterization of the variance provided, remedial payments for actual and estimated postage assessed, system accuracy defined, and other information for assessing, tabulating or correcting the performance of the mailing delineated. Such information identifies duplicate material, orphan material not appearing on the notification file, incorrect postage and any other information inconsistently resulting from such comparison.

From the foregoing it will be readily apparent that number benefits are provided to the various parties through use of the subject acceptance and verification system. For the addressor, the status within the mail handling process may be accessed at the server. Duplicate and out-of-sequence statements can be remedied. The cost effectiveness of the bulk mailing strategy and content can be assessed and modified for further savings. For the mailing agent, the timeliness and accuracy of the mailing routine can be demonstrated, varied and modified to optimize performance and increase effectiveness. For the postal system, physical acceptance of the items is not required, affixed postage versus correct postage determined and any deficiencies readily reported and collected, and status for each item processed demonstrated.

Having thus described a presently preferred embodiment of the present invention, it will now be appreciated that the objects of the invention have been fully achieved, and it will be understood by those skilled in the art that many changes in construction and widely differing embodiments and pherein are intended to be illustrative and are not in any sense limiting of the invention, which is defined solely in accordance with the following claims.

What is claimed:

1. A tracking system for a posted item created by a sender, prepared by a bulk mailer for delivery to a postal system and delivered by the postal system to an addressee, said tracking system comprising:

labeling means operative at the bulk mailer for affixing to the item a unique code capable of being interpreted by code reading means and including information regarding the sender, the bulk mailer, the addressee, postal rate criteria a spatial location in a bulk mailing;

data base means for creating a data base record for each item referenced to said unique code and accessible by the bulk mailer and the postal system, and for preparing a notification log;

server means operatively associated with said data base means for providing the postal system with said notification log prior to delivery of said posted item;

code reading means operative at said postal system for reading said unique code on the item and generating a processing log based thereon;

comparing means associated with said data base means for comparing said notification log with said processing log and generating an exception log available to the bulk mailer and the mailing system regarding variations with respect to discrete items on said exception log.

2. A system for the processing of a piece of mail delivered to a postal system by a bulk mailer in a bulk shipment for routing to an addressee comprising: means for imprinting on a label attached to the piece of mail a bar code unique to said piece of mail and designating mailing criteria including the bulk mailer, postage affixed to the mail, location of the piece of mail within the bulk shipment, said bar code readable by bar code reading equipment; means at said bulk mailer for creating a first file for said piece; transmitting said file to said postal system; means for reading said bar code on said piece of mail at said postal system and creating a second file for said piece; comparing said first file with said second file and generating a third file listing discrepancies therebetween; enabling access to said third tile for said bulk mailer and said postal system.

* * * * *